US009910717B2

(12) United States Patent
Wilson et al.

(10) Patent No.: US 9,910,717 B2
(45) Date of Patent: Mar. 6, 2018

(54) SYNCHRONIZATION METHOD

(71) Applicant: FUJITSU LIMITED, Kawasaki-shi, Kanagawa (JP)

(72) Inventors: Nicholas Wilson, Middlesex (GB); James Alastair Southern, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 14/554,646

(22) Filed: Nov. 26, 2014

(65) Prior Publication Data

US 2015/0309845 A1    Oct. 29, 2015

(30) Foreign Application Priority Data

Apr. 24, 2014    (EP) ..................................... 14165831

(51) Int. Cl.
G06F 9/46    (2006.01)
G06F 9/52    (2006.01)
G06F 9/50    (2006.01)

(52) U.S. Cl.
CPC ............... *G06F 9/522* (2013.01); *G06F 9/52* (2013.01); *G06F 9/46* (2013.01); *G06F 9/5038* (2013.01)

(58) Field of Classification Search
CPC ... G06F 9/50; G06F 9/522; G06F 9/52; G06F 9/5038; G06F 9/46
See application file for complete search history.

(56) References Cited

U.S. PATENT DOCUMENTS

| | | | | |
|---|---|---|---|---|
| 8,615,647 B2* | 12/2013 | Hum | ..................... | G06F 1/3203 712/32 |
| 2005/0120185 A1 | 6/2005 | Yamazaki et al. | | |
| 2006/0059489 A1* | 3/2006 | Koyanagi | ............... | G06F 9/485 718/100 |
| 2009/0222654 A1* | 9/2009 | Hum | ...................... | G06F 13/24 713/100 |
| 2010/0262966 A1* | 10/2010 | Dow | ..................... | G06F 1/3203 718/102 |
| 2014/0101663 A1* | 4/2014 | Dickson | ................ | G06F 9/5038 718/103 |
| 2014/0115596 A1* | 4/2014 | Khan | .................... | G06F 9/5011 718/104 |

(Continued)

OTHER PUBLICATIONS

Power gating, wikipedia, retrieved online on Feb. 21, 2017, pp. 1-3.*

(Continued)

*Primary Examiner* — Hanh T Bui
(74) *Attorney, Agent, or Firm* — Staas & Halsey LLP

(57) ABSTRACT

A synchronization method in a computer system with multiple cores, wherein a group of threads executes in parallel on a plurality of cores, the group of threads being synchronized using barrier synchronization in which each thread in the group waits for all the others at a barrier before progressing; the group of threads executes until a first thread reaches the barrier; the first thread enters a polling state, repeatedly checking for a release condition indicating the end of the barrier; subsequent threads to reach the barrier are moved to the core on which the first thread is executing; and other cores are powered down as the number of moved threads increases; and wherein when the first thread detects the release condition, the powered down cores are powered up and are available for use by the threads.

14 Claims, 4 Drawing Sheets

(56) References Cited

U.S. PATENT DOCUMENTS

| | | | |
|---|---|---|---|
| 2015/0067356 A1* | 3/2015 | Trichy Ravi | G06F 1/324 713/300 |
| 2015/0234687 A1* | 8/2015 | Vajapeyam | G06F 9/5088 718/105 |
| 2016/0321111 A1* | 11/2016 | Dickson | G06F 9/5038 |

OTHER PUBLICATIONS

Arkady Bron et al., Applications of Synchronization Coverage, Jun. 2005, ACM, retrieved online on Jul. 7, 2017, pp. 206-212. Retrieved from the Internet: <URL: http://delivery.acm.org/10.1145/1070000/1065972/p206-bron.pdf?ip=151.207.250.61&id=1065972&acc=ACTIVE%20SERVICE&key=C15944E53D0ACA63%2E4D4702B0C3E38B35%2E4D4702B0C3E38B35%2E4D4702B0C3E38B35&>.*

European Search Report mailed Oct. 15, 2014 in corresponding European application EP 14165831.0.

Nanjegowda, Ramachandra; Scalability Evaluation of Barrier Algorithms for OpenMP, HPCTools Group, Computer Science Department, University of Houston, Texas; 22 pgs.

Li, Jian; Martinez, Jose F; "The Thrifty Barrier: Energy-Aware Synchronization in Shared-Memory Multiprocessors" 10 pgs.

Swaminathan, Karthik; "Improving Energy Efficiency of Multi-Threaded Applications Using Heterogeneous CMOS-TFET Multicores" IEEE 2011, pp. 247-252.

Yang, Wenjing; "Exploiting Energy Savings Opportunity of Barrier Operation in MPI Programs" IEEE 2008, pp. 144-149.

Lukefahr et al., "Composite Cores: Pushing Heterogeneity into a Core", 2012 IEEE/ACM 45$^{th}$ Annual International Symposium on Microarchitecture, IEEE Computer Society, 2012, pp. 317-328**.

Extended European Search Report dated Jun. 15, 2016 in corresponding European Patent Application No. 14 165 831.0.

* cited by examiner

SYNCHRONIZATION METHOD

CROSS-REFERENCE TO RELATED APPLICATIONS

This application claims the benefit of European Application No. 14165831.0, filed Apr. 24, 2014, in the European Intellectual Property Office, the disclosure of which is incorporated herein by reference.

BACKGROUND

1. Field

The present invention relates to the energy efficiency of modern processors, sometimes referred to as central processing units (CPUs), particularly but not exclusively in high performance computing (HPC) applications. Computationally intense and other large-scale applications are usually carried out on HPC systems. Such HPC systems often provide distributed environments in which there is a plurality of processing units or "cores" on which independent sequences of events such as processing threads or processes of an executable can run autonomously in parallel.

2. Description of the Related Art

Many different hardware configurations and programming models are applicable to HPC. A popular approach to HPC currently is the cluster system, in which a plurality of nodes each having one or more multicore processors (or "chips") is interconnected by a high-speed network. Each node is assumed to have its own area of memory, which is accessible to all cores within that node. The cluster system can be programmed by a human programmer who writes source code, making use of existing code libraries to carry out generic functions. The source code is then compiled to lower-level executable code, for example code at the ISA (Instruction Set Architecture) level capable of being executed by processor types having a specific instruction set, or to assembly language dedicated to a specific processor. There is often a final stage of assembling or (in the case of a virtual machine, interpreting) the assembly code into executable machine code. The executable form of an application (sometimes simply referred to as an "executable") is run under supervision of an operating system (OS).

Applications for computer systems having multiple cores may be written in a conventional computer language (such as C/C++ or Fortran), augmented by libraries for allowing the programmer to take advantage of the parallel processing abilities of the multiple cores. In this regard, it is usual to refer to "processes" being run on the cores. A (multi-threaded) process may run across several cores within a multi-core CPU.

Each process is a sequence of programmed instructions, and may include one or more threads. A thread can be the smallest sequence of programmed instructions that can be managed by an operating system scheduler. Multiple threads can exist within the same process and often share resources, such as memory, whereas in general processes do not share resources.

One library used by programmers is the Message Passing Interface, MPI, which uses a distributed-memory model (each process being assumed to have its own area of memory), and facilitates communication among the processes. MPI allows groups of processes to be defined and distinguished, and includes routines for so-called "barrier synchronization", which is an important feature for allowing multiple processes or processing elements to work together. Barrier synchronization is a technique of holding up all the processes in a synchronization group executing a program until every process has reached the same point in the program. This may be achieved by an MPI function call which has to be called by all members of the group before the execution can proceed further.

Alternatively, in shared-memory parallel programming, all processes or cores can access the same memory or area of memory. In a shared-memory model there is no need to explicitly specify the communication of data between processes (as any changes made by one process are transparent to all others). As for an MPI code, barrier synchronization is often required in a thread-parallel code to ensure that all threads are at the same point in the program before execution proceeds further.

Energy efficiency is becoming an increasingly important factor in HPC. Today's largest HPC systems (http://www.top500.org/list/2013/11/) can draw up to 17 MW of energy. As the annual cost of energy is reaching around $1 million per MW (in the USA) the operational expenditure on energy for a HPC facility is beginning to become a critical factor in system design. The proposed power budget for a future exascale system (30 times faster than the current fastest system) is 20 MW (less than a 1.2 times increase in power). Thus, the development of new techniques to optimize power usage within HPC systems (and in other computer systems) is vitally important.

As mentioned above, modern CPUs consist of several physical cores (processing units). For example, the Fujitsu SPARC64™ IXfx CPU contains sixteen cores. The number of logical cores (i.e. cores perceived to be available by an application) may be further increased by the use of hardware multithreading (scheduling two or more threads simultaneously on one physical core).

In order to extract maximum performance from the CPU, an application will generally run multiple threads of execution within the CPU, where different threads can be executed on different logical cores. In some applications there may be more threads than there are logical cores available with the threads being dynamically allocated to cores by the operating system scheduler. HPC applications, on the other hand, tend to assign one thread to each logical core and each thread may be "pinned" to a specific physical core (i.e. the thread is executed from start to finish on this core). These choices reduce the need to move data around the memory hierarchy (since the thread that is working with a given section of memory stays in the same physical location) and can reduce resource contention.

In general, all threads in a parallel code execute independently of one another within the cores that they are pinned to, acting on variables stored within memory that may be either shared (visible to all threads) or private (to one thread). However, periodically there may be a need for the threads to synchronize with one another (e.g. to agree collectively on the value of a particular variable, for one thread to communicate the value of a private variable to other threads or to avoid a "race condition", where multiple threads write to a shared variable). These synchronization points require each thread to be in the same state. Thus, when the first (and each subsequent) thread arrives at the (barrier) point in the code at which synchronization is to be carried out it must pause execution and wait until all of the other threads also reach the same state. This process of waiting for all threads to be in the same state is known as a barrier (or barrier mechanism), which functions in the same way as the barrier synchronization mentioned above for MPI processes and other processes, but on a per-thread basis, rather than on a per-process basis.

FIG. 1 is a timeline representation showing typical thread barrier operation. The same diagram applies to process barrier operation, by a simple change of "thread" to "process" in the labeling. This is also true of all the other figures.

The case of six threads is shown. Each thread hits the barrier at the point indicated by the black diamond shape. The global barrier is said to start once the first thread reaches the barrier and end when the final thread reaches the barrier (after which normal execution continues). Threads that have reached the barrier actively poll to determine whether or not all other threads have also reached the barrier. This active polling (a "busy wait") is the shaded region shown for threads 0, 1, 3, 4 and 5. Thread 2 is the last thread to reach the barrier and triggers the end of the barrier and thus the end of the polling). The active polling can consume energy unnecessarily.

Various methods are used to implement thread barriers, but most rely either on a "busy-wait" as explained above (each process repeatedly polls for the value of a variable that determines whether the barrier has ended) or on blocking algorithms that de-schedule threads to prevent their continued execution. The threads can be de-scheduled and re-scheduled by (for example) calls to pthread library routines. So, pthread_cond_wait( ) can be used to tell a thread to wait until another thread (the last to the barrier) makes a call to pthread_cond_broadcast( ) which wakes up all the other threads.

It is desirable to reduce unnecessarily consumed energy associated with barrier operation.

SUMMARY

Additional aspects and/or advantages will be set forth in part in the description which follows and, in part, will be apparent from the description, or may be learned by practice of the invention.

According to an embodiment of a first aspect of the invention there is provided a synchronization method in a computer system with multiple cores, wherein a group of threads executes in parallel on a plurality of cores, the group of threads being synchronized using barrier synchronization in which each thread in the group waits for all the others at a barrier point before progressing; the group of threads executes until a first thread reaches the barrier point; the first thread enters a polling state, repeatedly checking for a release condition indicating the end of the barrier synchronization; subsequent threads to reach the barrier point are moved to the core on which the first thread is executing; and other cores are powered down as the number of moved threads increases; and wherein when the first thread detects the release condition, the powered down cores are powered up (and are therefore again available for use by the threads).

Thus, according to invention embodiments there is a group of threads which executes in parallel on a plurality of cores. The cores may be on a single node or spread over several nodes. The benefit would probably be greatest on a single node and for barrier synchronization across multiple nodes, the threads would probably not be migrated between the nodes. Hence in a scenario in which the group of threads executes on a plurality of nodes, either the method is carried out on one of those nodes only, with threads on other nodes entering a polling state or becoming de-scheduled, or alternatively the first thread which reaches the barrier for each node enters the polling state and the subsequent threads on that node are moved to the core from that node, so that each node on which at least one of the group of threads is executing may include one core which is active and other cores which are powered down as the number of moved threads increases.

In this description of invention embodiments, the term "core" refers to a physical core within the processor, i.e. a physical processing unit, for example containing its own circuitry and cache. The physical core may be capable of execution independent from all other physical cores in the processor (and potentially able to be powered down independently of the rest of the processor).

In a programming context, a physical core may consist of more than one "logical core" which can be used during execution of a program, as explained above. However, these logical cores share physical resources within the processor and could not be powered down independently of one another. Hence, their use is outside the scope of this invention.

Particularly with threads pinned to physical cores, a barrier requires each physical core to be able to run a thread that actively polls during the barrier. This wastes energy (in the sense that energy is being used on many physical cores, without useful computation being carried out). The inventors have come to the realization that a more energy efficient barrier would be able to power down the cores that have polling threads pinned to them and that are simply waiting at the barrier, restarting the cores once all threads reach the synchronization point and the barrier ends.

Powering down cores that are in a busy-wait state is clearly not possible (since they are required to repeatedly poll and may, in fact, be using more energy than normal by repeatedly accessing memory). Blocking barriers, on the other hand, would appear more amenable to energy saving since they do not require the waiting threads to remain active. However, even while the thread is inactive it is necessary for the core to stay awake in order that it can re-schedule the thread once the barrier ends. Further, blocking barriers are generally considered most suitable for the case when cores are oversubscribed with threads (i.e. not the typical HPC case of one thread per core) and do not scale as well as busy-waits (due to mutual exclusion (mutex) and condition variables and context switching), so they are unlikely to be used on HPC systems.

Invention embodiments can act to reduce the number of threads required to carry out a busy-wait at a barrier and allow most of the cores that are waiting at the barrier to be powered down in order to save energy. The underlying idea is that the first thread to reach the barrier actively polls for the end of the barrier, but other threads need not. Second and other subsequent threads reach the barrier and are no longer active. These subsequent threads may be moved (or "unpinned") from the cores on which they are running, and transferred to the core on which the first thread is carrying out the busy-wait and then put to sleep (de-scheduled—so effectively they use a blocking algorithm at the barrier). Once empty of active threads, the computational cores can be powered down, thus saving energy. Once the final core reaches the barrier or at some other suitable point acting as a release condition, all cores can be powered up again.

It should be noted that while this aspect focuses on threads, the same principle and definitions can also be applied to processes such as MPI processes at an MPI barrier, for example in a distributed application.

In preferred embodiments, when the first thread detects the release condition, the subsequent threads (that reach the barrier after the first thread) are moved back to the cores on which they were previously executing and program execution continues following the barrier.

Each thread may be associated with a single core for execution, so that if the thread (if there is a single thread) or each thread (if there is a plurality of threads) associated with the core reaches the barrier and is moved, the core is powered down. Hence when more than one thread is associated with a single core, the core can only power down once all the threads have been moved. Conversely, if there is only one thread associated with a certain core, that core can power down when the single thread reaches the barrier and is moved.

The thread may be pinned to one core to which it is associated, so that by default the thread is executed on that core from start to finish. If it is pinned to an associated core, the thread may only be moved during the barrier, at which point it is not active/executing.

As an alternative, each thread may be associated with a single non-uniform memory architecture (NUMA). In this case threads can "float" between cores within a socket. There may be multiple sockets within each node, each socket associated with a distinct NUMA region. Each NUMA region consists of a collection of cores with a direct pipe to an area of memory physically located within that NUMA region.

Any suitable method may be used for monitoring the progress towards all of the threads for synchronization reaching the barrier. In one preferred embodiment, each thread reaching the barrier increments a shared counter. Thus subsequent threads may check once for the release condition after their increment. The subsequent threads may then move to the core on which the first thread is executing.

Not necessarily all threads after the first thread to reach the barrier are moved from the cores on which they are executing. Some of the later threads to reach the barrier may remain on the cores on which they are executing. More preferably, a last thread to reach the barrier is not moved to the core on which the first thread is executing. This last thread to reach the barrier may simply continue with execution of the program following the barrier after incrementing the shared counter and checking for the release condition.

One advantage of invention embodiments is that even when subsequent threads are moved to the core on which the first thread is executing, local memory at the cores on which the move to subsequent threads were executing can remain in an unchanged state. Once the subsequent threads are moved back to these cores, the thread operation can continue. Thus the local memory may then be updated due to continuation of thread execution.

Once the subsequent threads to reach the barrier have been moved to the core on which the first thread is executing, they may be de-scheduled or they too may enter the busy-wait state and poll for the release condition. Preferably, the subsequent threads are de-scheduled at this point and more preferably the first thread wakes the de-scheduled subsequent threads before moving them back to the cores on which they were executing. This alternative provides a greater reduction in energy use.

Any suitable release condition can be used to trigger re-activation of the powered down cores (and possibly movement of the subsequent threads back to the cores on which they were executing). For example, a simple timer could be used or even a measure of energy usage by the cores, which could indicate that a reduced number of threads is still executing.

The release condition indicates the end of the barrier mechanism, but can be provided in advance of when the barrier mechanism ends (so that it heralds the approach of the barrier end and processing can resume more quickly). In preferred embodiments, the release condition is that a required number of the group of threads has reached the barrier. This required number may be all the threads for example, or all but one, two or three of the threads.

In a particularly preferred embodiment the release condition is that all but the last thread have reached the barrier.

As mentioned previously, the last thread to reach the barrier need not be moved to the core on which the first thread is executing. It is also possible that one or more later threads to reach the barrier are not moved, but instead enter a polling state until the last thread reaches the barrier. For example, the penultimate thread may not be moved to the core on which the first thread is executing because it is likely to be a very short period of time before the last thread finishes executing (and the barrier ends).

If there is a situation in which one or more later threads are in the polling state and have not moved, and some subsequent threads have been moved to the core on which the first thread is executing, then the subsequent threads can be moved back to the cores on which they were executing when the last thread reaches the barrier.

Alternatively, the subsequent threads may have been moved back once the release condition is met, and enter a polling state until the last thread reaches the barrier (if the release condition occurs before the last thread reaches the barrier and thus before the barrier mechanism ends).

According to an embodiment of a further aspect there is provided a computer system with multiple cores arranged to implement a synchronization method wherein a group of cores is arranged to allow parallel execution of a plurality of threads using barrier synchronization, wherein each thread in the group waits for all the others at a barrier before progressing; the cores are arranged to allow execution of the threads until a first thread reaches the barrier; the core on which the first thread is executing is arranged to then allow the first thread to enter a polling state, in which it checks for a release condition indicating the end of the barrier; and further cores are arranged to allow execution of subsequent threads which reach the barrier subsequently; to allow the subsequent threads to be moved to the core on which the first thread is executing and then to be powered down as the number of moved threads increases; wherein the core on which the first thread is executing is arranged to allow the first thread to detect the release condition; and to allow the subsequent threads to move back to the further cores, and the further cores are operable to be powered up for use by the threads.

The computer system may be an HPC system. It comprises at least one group of cores, and may comprise a plurality of nodes each including multiple cores. The nodes are usually connected by an interconnect and include a specific area of memory as well as at least one multicore processor, and input and output functionality.

The statements of invention set out hereinbefore refer specifically to threads. However the invention is equally applicable to processes which are another independent sequence of events in a computing system. Thus, all of the above statements are equally applicable to processes.

For example, according to an embodiment of a still further aspect there is provided a synchronization method in a computer system with multiple cores, wherein a group of processes executes in parallel on a plurality of cores, the group of processes being synchronized using barrier synchronization in which each process in the group waits for all the others at a barrier before progressing; the group of processes executes until a first process reaches the barrier; the first process enters a polling state, repeatedly checking for a release condition indicating the end of the barrier; subsequent processes to reach the barrier are moved to a core on which the first process is executing; and other cores are powered down as the number of moved processes increases; and wherein when the first process detects the release condition, the powered down cores are powered up and are available for use by the processes.

A process may execute on more than one core, but normally only on a single node. Each node may be running more than one process.

In some embodiments (in which the group of processes executes on a plurality of nodes), processes may be moved between nodes. This might enable an entire node to be powered down (although this could be disadvantageous, for example if power is lost to the node memory). In most scenarios involving synchronization of processes across more than one node, the processes within each node would be moved to a single core and then all the other cores in that node would be powered down. Thus one core per node would stay up, rather than one core in total.

According to an embodiment of a final aspect there is provided a computer system with multiple cores arranged to implement a synchronization method wherein a group of cores is arranged to allow parallel execution of a plurality of processes using barrier synchronization, wherein each process in the group waits for all the others at a barrier before progressing; the cores are arranged to allow execution of the processes until a first process reaches the barrier; a core on which the first process is executing is arranged to then allow the first process to enter a polling state, in which it checks for a release condition indicating the end of the barrier; and further cores are arranged to allow execution of subsequent processes which reach the barrier subsequently; to allow the subsequent processes to be moved to the core on which the first process is executing and then to be powered down as the number of moved processes increases; wherein the core on which the first process is executing is arranged to allow the first process to detect the release condition; and to allow the subsequent processes to move back to the further cores, and the further cores are operable to be powered up for use by the processes.

According to a further general program aspect there is provided a program which when loaded onto a computing apparatus such as a distributed computer system configures the computing apparatus to carry out the method steps according to any of the preceding method definitions or any combination thereof.

Features and sub features of any of the different aspects of the invention may be freely combined. For example, preferred embodiments of the computer system may be configured to incorporate functionality corresponding to one or more preferred features of the methods.

The invention can be implemented in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a library, stand-alone program or as a module, component, subroutine, or other unit suitable for use in a data processing environment.

Method steps of the invention can be performed by programmable processors executing a computer program to perform functions of the invention by operating on input data and generating output.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software, preferably at a lower level than application software.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
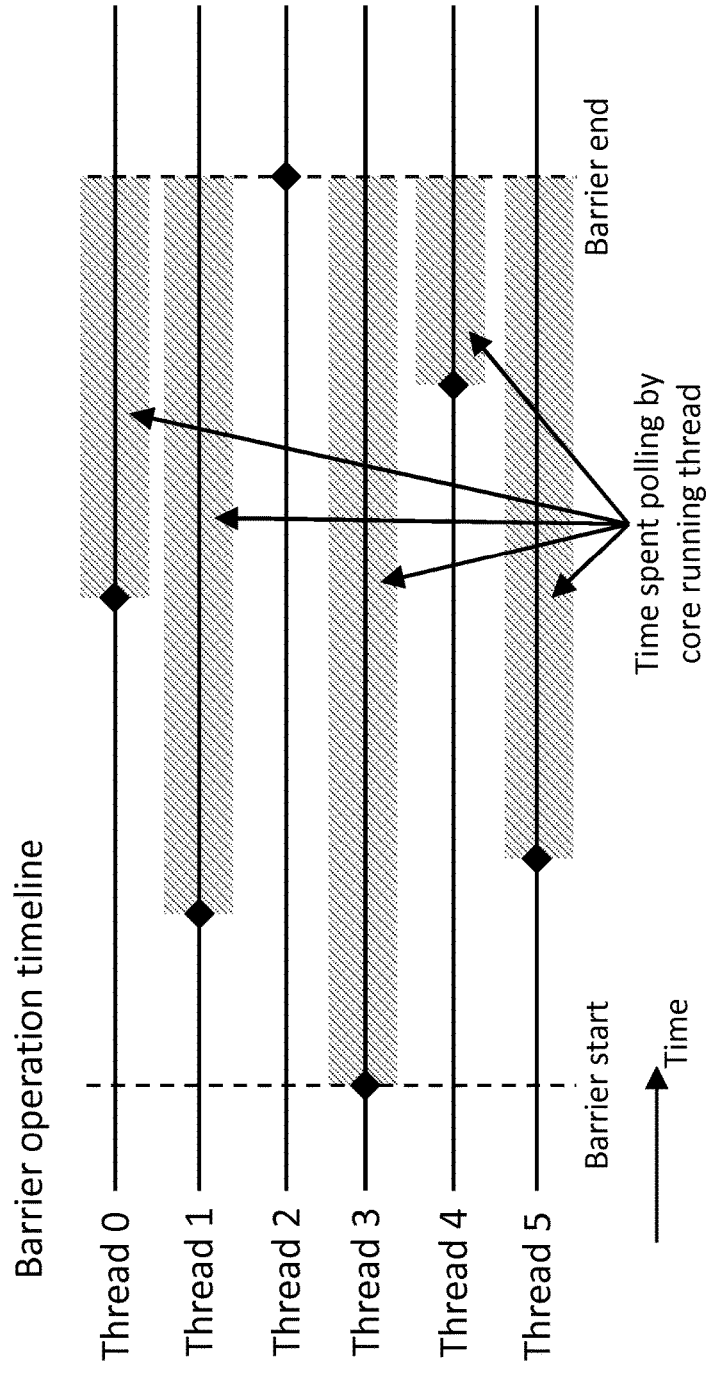
FIG. 1 (described above) is a schematic timeline showing threads and the operation of a barrier.

Reference will now be made in detail to the embodiments, examples of which are illustrated in the accompanying drawings, wherein like reference numerals refer to the like elements throughout. The embodiments are described below to explain the present invention by referring to the figures.

Figure 2:
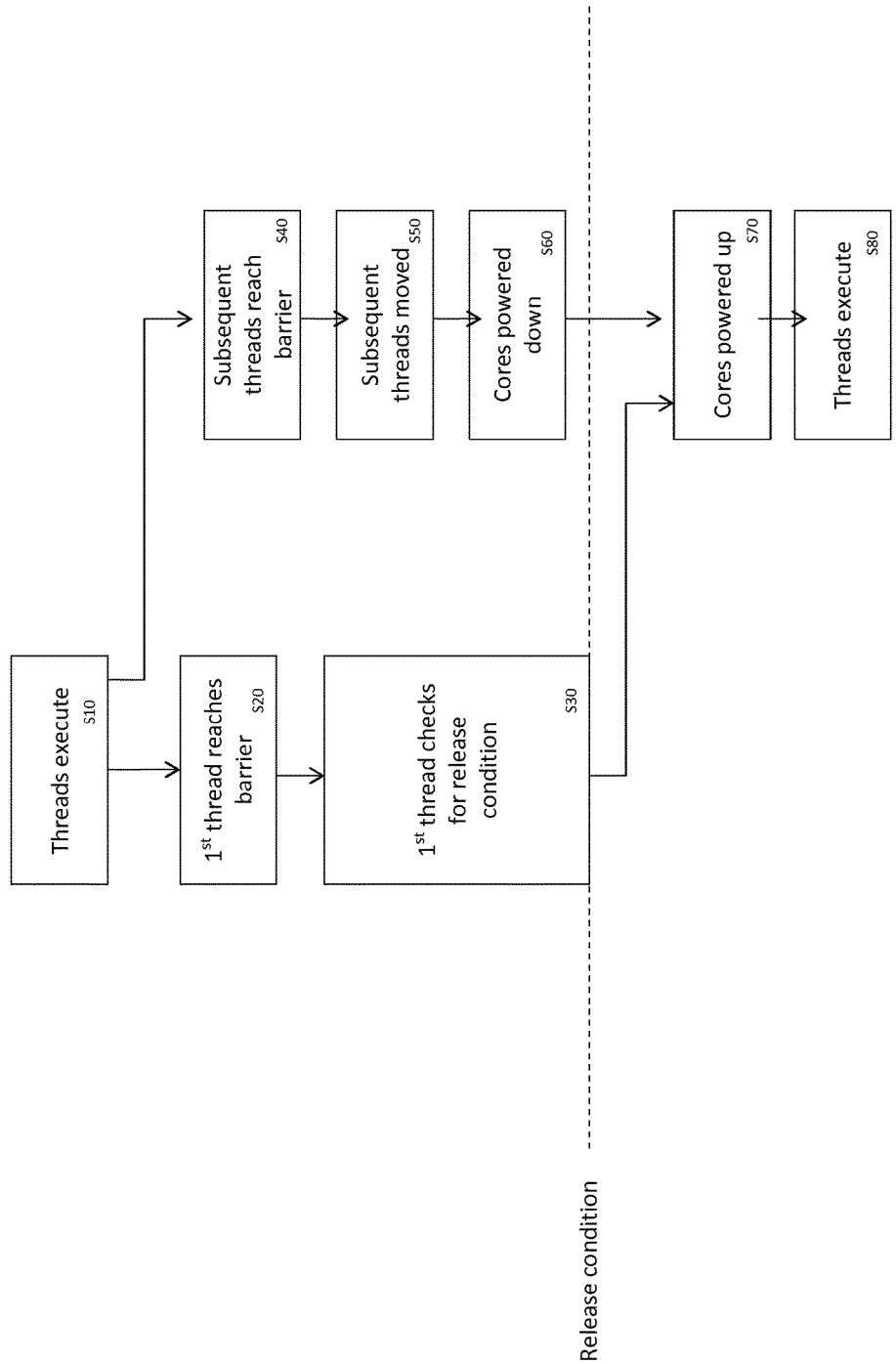
FIG. 2 is a flow diagram depicting a general embodiment of the invention.

FIG. 2 shows in flow diagram form a general embodiment of the invention. Initially, the threads execute in step S10 and a first thread reaches the barrier in step S20. The first thread then checks for the release condition in step S30 which is carried out repeatedly until the release condition is satisfied, as shown by the horizontal dashed line in the figure. In parallel with this action by the first thread, subsequent threads are reaching the barrier in step S40 and are then moved in step S50 so that cores on which no thread is present can be powered down in step S60. Once the release condition indicated by the dashed line is fulfilled, these cores are then powered up in step S70 and threads continue to execute in step S80.

Figure 3:
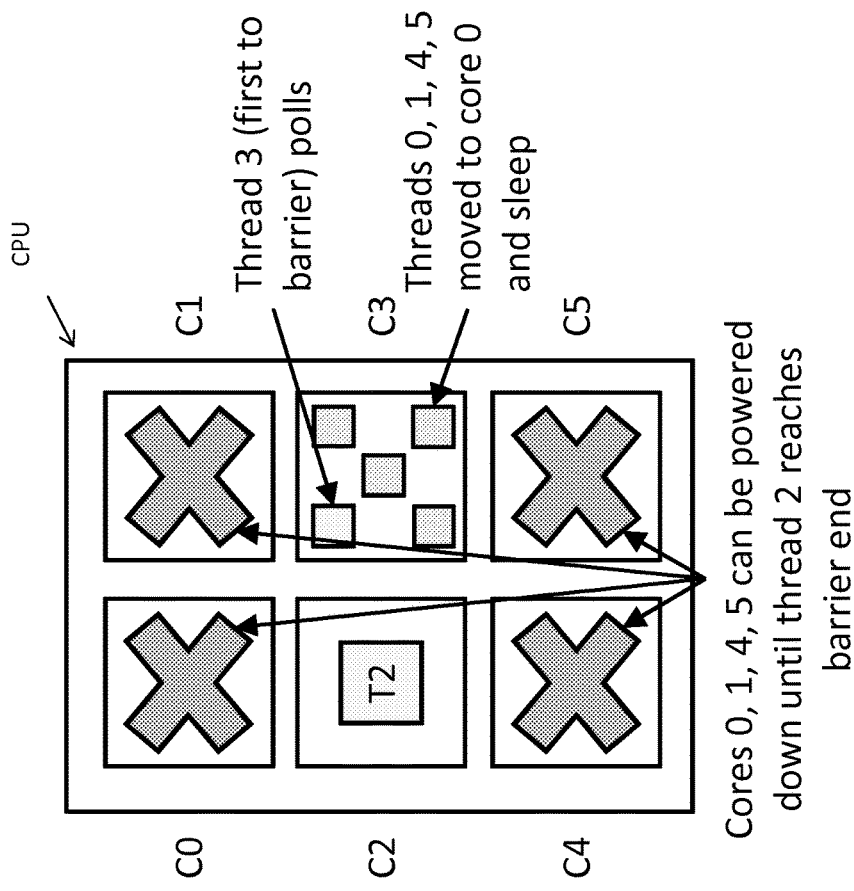
FIG. 3 is a comparison of prior art barrier operation and barrier operation according to invention embodiments.
Figure 3:
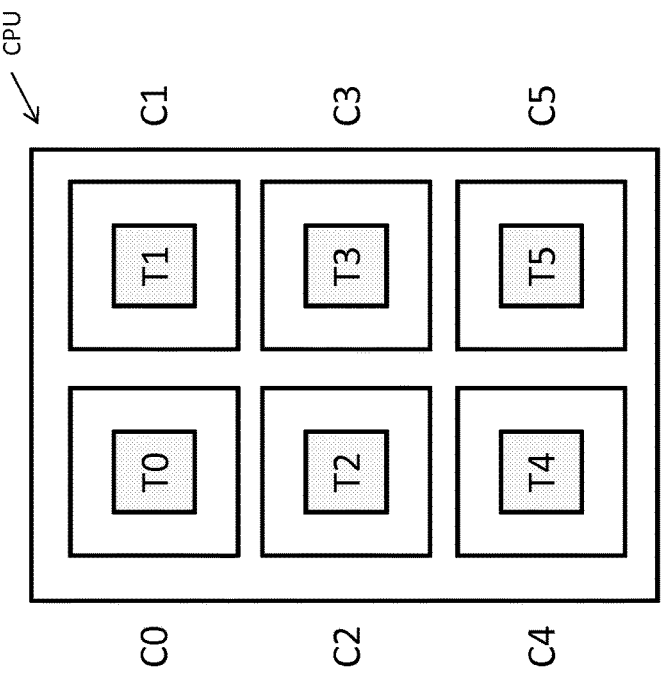

FIG. 3 is a comparison of the prior art (to the left) with invention embodiments (to the right). The schematic diagrams both show six cores C0-C5 for example at a node. The six cores may together form a CPU (and one or more CPUs may be provided for each node). Each core has an associated executing thread T0-T5. In the prior art, all threads are pinned to a core and active during a barrier. In the right hand schematic diagram, the threads have been executed in the same layout as in the prior art, but a method according to an invention embodiment is carried out.

In the barrier example illustrated on the right in FIG. 3, cores C0, C1, C4 and C5 can be powered down until Thread 2 reaches the barrier end. Thread 3 (on Core 3) reaches the barrier first. This thread continues with a busy-wait. When Threads 0, 1, 4 and 5 reach the barrier, however, they are unpinned from Cores 0, 1, 4 and 5 and put to sleep on Core 3. Cores 0, 1, 4 and 5 can be powered down during this time. Meanwhile, Thread 2 continues to run on Core 2. When Thread 2 (the last thread) reaches the barrier, Thread 3 wakes Threads 0, 1, 4 and 5, which are then moved back to Cores 0, 1, 4 and 5 for continued execution. When the threads are migrated, they leave their data on the core where they were running, and so no data transfer is involved in the moving of the threads or in re-starting the execution.

There are unlikely to be so few threads in practice. More threads will be more advantageous. The upper bound on thread or process numbers may be determined by the number of physical cores within a compute node (currently in the hundreds on an accelerator-type node) or by the number of potential MPI processes across a whole system (up to hundreds of thousands or millions).

Figure 4:
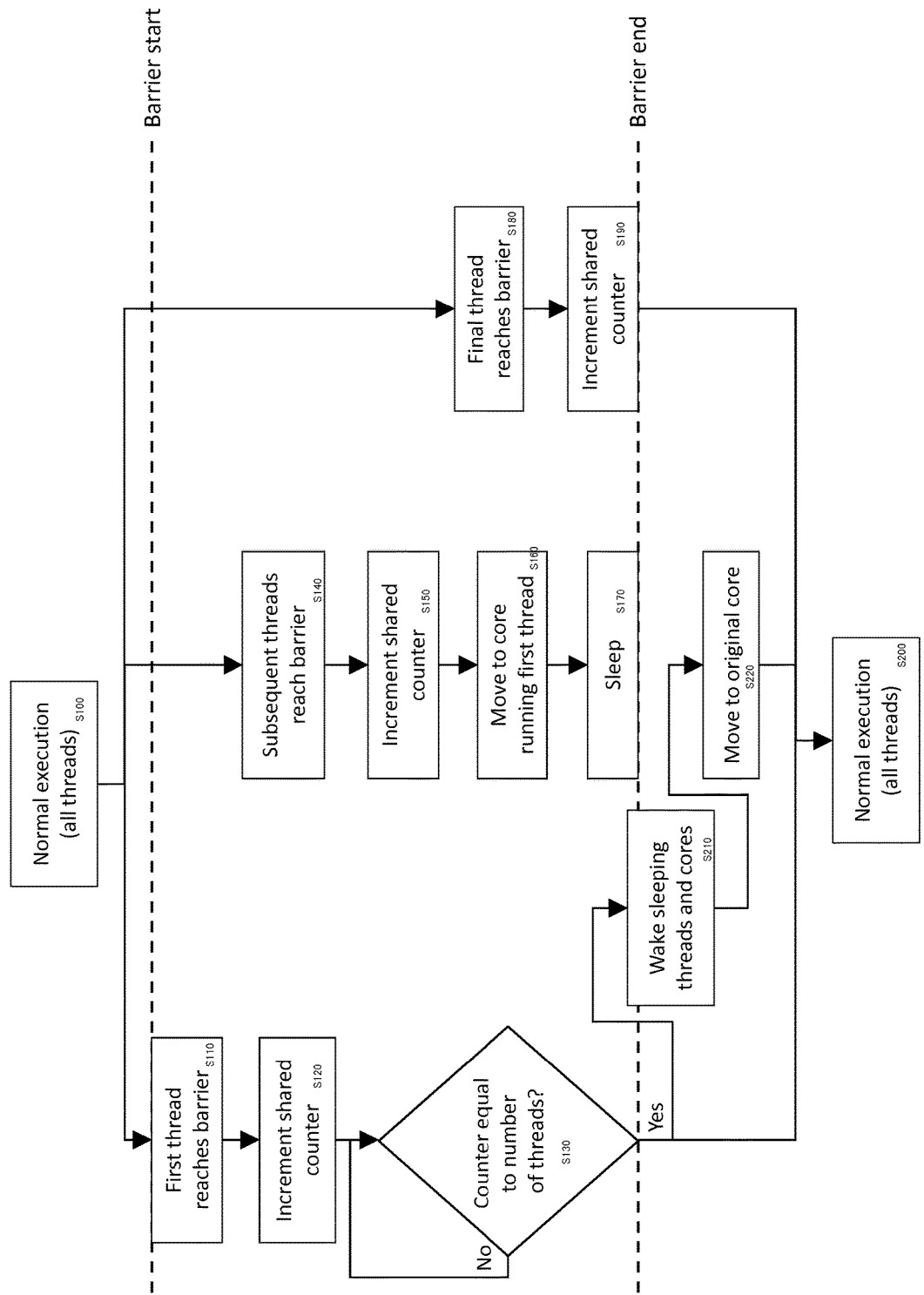
FIG. 4 is a flowchart illustrating the operation of a specific invention embodiment.

FIG. 4 is a flow chart showing the progress of various threads through a barrier as proposed in an invention embodiment. In the prior art (busy-wait), all threads would take the left-hand route through steps S100, S110, S120, S130 and S200. Each thread would increment a counter and then poll until the counter value reaches the number of threads.

Using the method of this embodiment, only one core is required to carry out this energy-intensive operation. Subsequent threads that reach the barrier are instead moved off the core that they are running on, which is then powered down to save energy. At the end of the barrier all cores are powered up again and threads moved back to their original location.

Initially there are N threads, pinned to N cores within a node (one or more CPUs that share the same memory). These threads are executing (S100) a parallel region within a program (i.e. all are carrying out independent tasks) with a synchronization point at the end of it. This synchronization point includes a barrier, where each thread has to wait for all of the others to finish before carrying out some collective operation.

One thread will reach the barrier first (S110). As in the prior art barrier implementation this thread should increment a shared counter (which records how many of the threads have reached the barrier) from zero to one (S120) and then begin a busy-wait: repeatedly checking whether the value of the shared counter has reached N (S130). When the nth thread (running on core n) reaches the barrier (S140) it also increments the shared counter (from n−1 to n) in step S150 and checks once whether the value has reached N. If not, then rather than carrying out a busy-wait this thread is unpinned from the core on which it is running and moved in step S160 to the core that is running the first thread to reach the barrier, where it is de-scheduled in step S170 (i.e. enters a sleep state). There is now no work scheduled on core n, (in this one thread per core scenario) so this is powered down in order to save energy. Looking now at the last thread to reach the barrier in step S180, the value of the shared counter does equal N following the increment in step S190. n=N and all threads have reached the barrier (i.e. the barrier is ready to end). In this situation the thread reaching the barrier can continue with normal execution in step S200 without being unpinned from its core.

Meanwhile, the first thread to reach the barrier has been checking the value of the shared counter in step S130. Shortly after the final thread increments the counter and continues normal execution of the program, this thread will notice that the value of the counter is now equal to N. In the prior art this thread would then also continue with normal execution. However, in the invention embodiment detailed here it must first act to power up the other cores and to wake the other threads, in parallel or in either order (S210) and move them back in step S220 to the cores on which they were originally running (and where the local memory remains in the same state as before being powered down). Once this has been done, all the threads can continue with normal execution in step S200.

The exact algorithms described above used at the barrier for the embodiments shown in FIGS. 3 and 4 can be modified slightly while retaining the key feature of powering down most of the cores that would otherwise perform a busy-wait. Possible modifications include:

- The method may power up sleeping cores (and possibly begin the process of moving threads back to them) when the penultimate thread (or a previous thread) reaches the barrier (rather than the last). This would save time by having the cores ready to go immediately the barrier ends (when the last thread reaches it). Note that if threads were moved back to the cores before the end of the barrier then they could perform a busy-wait to determine the end of the barrier.
- Unpinned and moved cores may not be required to be de-scheduled after being moved to the core running the first thread to hit the barrier. Simply having all threads carrying out a busy-wait on this core may be no more costly in terms of energy than having one thread do so (since each thread would poll in turn). This would have the advantage of not incurring the costs in mutex and condition variables seen in standard blocking barriers. Note, however, that it is important that no data movement is carried out in moving the threads.
- Most likely there will be a cost (certainly in terms of time and possibly in terms of energy) to moving threads between cores and to re-starting cores. Thus, it may only be desirable to turn on this behaviour if a parameter such as the mean wait time (and/or mean energy cost) of barrier operations in an application is above some threshold value. This could be implemented via profile-guided execution (i.e. the system detects whether or not the new barrier implementation would be advantageous while an application is running) or by a user (or system administrator) manually specifying when the modified barrier should be used.
- The same methodology can also be used for processes, such as MPI processes. There are no changes needed to make it equally applicable to processes at the algorithmic level. Changes would need to be implemented to replace busy waits within an MPI library and some message passing may be required, but this would be entirely analogous to the algorithm when using threads within a node. For example, there might be a two level hierarchy where the process within a node would be the same as in the thread scenario but there would be an additional level of synchronization between nodes. The two-level hierarchy is because each node may be running more than one process (MPI processes, for example, which should not span more than one node). Hence the processes within each node may be one level of the hierarchy which is implemented analogously to the thread methodology, while the more expensive inter-node barrier is the second level (and may not include movement of processes between nodes).
- The invention embodiments could also work with hardware multithreading (known as hyper-threading in some Intel implementations) with more than one thread per core, and if so threads would simply be moved to a single physical core as they hit the barrier and other cores gradually shut down as more threads reach the barrier. Or, alternatively, threads on one core could carry out a busy• wait until a given number of threads reach the barrier and then all be moved and the core shut down. This might reduce the benefit compared to applications running with one thread per core, but is still advantageous. Hardware multithreading, such as Intel's Hyper-threading or simultaneous multi-threading (SMT) in, for example, the POWER architecture, are advantageous in only a subset of HPC applications.

The barrier itself could be implemented either in software or in hardware (software is probably most common). However, the thread migration would almost certainly require software implementation, so the invention embodiments would probably have to be at least partially software-based.

The barrier of invention embodiments could be written directly into the code executing the threads (or processes), but is more likely to be part of the operating system or library that controls the way that the threads behave on the system. It might, for example, be a direct replacement for the code that currently exists in those libraries to perform busy-waits.

Thus the method of invention embodiments is likely to be implemented in system software (probably operating system or a library) which is available on all nodes. It is possible, but unlikely, for the barrier to be implemented directly in application software (it would not be desirable to have to re-implement something as simple as a barrier in software for every application).

Invention embodiments can have the following advantageous features:

Powering down cores whose associated threads have reached the barrier
  The prior art is not capable of powering down cores during a barrier operation, resulting in wasted energy.
Unpinning threads from cores during a barrier operation (necessary to allow cores to power down). Note that threads remain pinned to cores outside of a barrier.
  The prior art does not move threads between cores during a barrier operation (although they may be de-scheduled on the core that they are pinned to by a blocking implementation of a barrier).

One key benefit of invention embodiments can be seen as power saving, as a result of not having all cores running during a barrier (and, in particular, not having them carrying out potentially high-power busy-waits).

In preferred embodiments, there is only one (idle) core active at a barrier, rather than all of the cores, as in the case in the prior art. This may be achieved by unpinning waiting threads from their associated cores and subsequent powering down of these cores.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A synchronization method in a computer system with multiple cores, the method comprising:
   executing a group of threads in parallel on a plurality of cores, the group of threads being synchronized using barrier synchronization in which each thread in the group waits for all other threads at a barrier before progressing, the group of threads executes until a first thread reaches the barrier;
   repeatedly checking, when the first thread enters a polling state, for a release condition indicating that a required number of the group of threads has reached the barrier and become inactive;
   moving some or all subsequent inactive threads to reach the barrier to a core on which the first thread is executing;
   descheduling the inactive moved threads once they have been moved to the core on which the first thread is executing; and
   powering down other cores to shut down as a number of moved threads increases;
   wherein when the first thread detects the release condition, powered down cores are powered up and are available for use by the threads; and
   the first thread wakes the inactive moved threads before moving the inactive moved threads back to the cores on which the inactive moved threads were executing, and then the threads continue with normal execution,
   wherein a last thread to reach the barrier is not moved to the core on which the first thread is executing and continues with thread execution.

2. A synchronization method according to claim 1, wherein each thread is associated with a single core for execution, where if each thread associated with a core reaches the barrier and is moved, the single core is powered down.

3. A synchronization method according to claim 1, wherein each thread is pinned to one associated core, where by default the thread is executed on the associated core from start to finish, and the thread may only be moved when at the barrier.

4. A synchronization method according to claim 1, wherein each thread is associated with a single non-uniform memory architecture (NUMA) region, where as threads associated with the NUMA region reach the barrier and are moved, cores within the NUMA region are powered down.

5. A synchronization method according to claim 1,
   wherein each thread reaching the barrier increments a shared counter, and
   wherein inactive threads check once for the release condition after an increment by a one of the subsequent threads and before movement to the core on which the first thread is executing.

6. A synchronization method according to claim 1, wherein local memory at the cores on which inactive moved threads were executing remains in an unchanged state until the inactive moved threads are moved back to the cores.

7. A synchronization method according to claim 1, wherein the release condition is that all of the group of threads has reached the barrier.

8. A synchronization method according to claim 1,
   wherein the release condition is that less than all of the group of threads has reached the barrier.

9. A synchronization method according to claim 8,
   wherein a later thread to reach the barrier is not moved to the core on which the first thread is executing, but enters a polling state until a last thread reaches the barrier, before continuing with thread execution, and
   wherein either the inactive moved threads are not moved back to the cores on which they were executing until the last thread reaches the barrier, or the inactive moved threads are moved back to the cores on which they were executing once the release condition is met, and enter a polling state until the last thread reaches the barrier.

10. A computer system with multiple cores arranged to implement a synchronization method, the system comprising:
- a group of cores, having processors, arranged to allow parallel execution of a plurality of threads using barrier synchronization, where each thread in the group waits for all other threads at a barrier before progressing, the cores are arranged to allow execution of the threads until a first thread reaches the barrier;
- a core on which the first thread is executing is arranged to then allow the first thread to enter a polling state, in which the first thread checks for a release condition indicating that a required number of the group of threads has reached the barrier; and
- further cores are arranged to allow execution of subsequent threads which reach the barrier subsequently and become inactive, to allow some or all of the inactive threads to be moved to the core on which the first thread is executing and then to be powered down to shut down as a number of moved threads increases;
- wherein the core on which the first thread is executing is arranged to allow the first thread to deschedule the some or all inactive moved threads once they have been moved to the core on which the first thread is executing, to detect the release condition, to wake the inactive moved threads before moving the inactive moved threads back to the further cores on which the inactive moved threads were executing, and then the threads continue with normal execution, and the further cores are operable to be powered up for use by the threads,
- wherein a last thread to reach the barrier is not moved to the core on which the first thread is executing and continues with thread execution.

11. A non-transitory, machine-readable storage medium storing a computer program which when executed on a computer system with multiple cores, carries out a method, the method comprising:
- executing a group of threads in parallel on a plurality of cores, the group of threads being synchronized using barrier synchronization in which each thread in the group waits for all other threads at a barrier before progressing, where the group of threads executes until a first thread reaches the barrier;
- repeatedly checking, when the first thread enters a polling state, for a release condition indicating that a required number of the group of threads has reached the barrier and become inactive;
- moving some or all subsequent inactive threads to reach the barrier to a core on which the first thread is executing;
- descheduling the inactive moved threads once they have been moved to the core on which the first thread is executing; and
- powering down other cores to shut down as a number of moved threads increases,
- wherein when the first thread detects the release condition, powered down cores are powered up and are available for use by the threads; and
- the first thread wakes the inactive moved threads before moving the inactive moved threads back to the cores on which the inactive moved threads were executing, and then the threads continue with normal execution,
- wherein a last thread to reach the barrier is not moved to the core on which the first thread is executing and continues with thread execution.

12. A synchronization method in a computer system with multiple cores, comprising:
- executing a group of processes in parallel on a plurality of cores, the group of processes being synchronized using barrier synchronization in which each process in the group waits for all other processes at a barrier before progressing;
- executing the group of processes until a first process reaches the barrier;
- repeatedly checking, when the first process enters a polling state, for a release condition indicating that a required number of the group of processes has reached the barrier and become inactive;
- moving some or all of subsequent inactive processes to reach the barrier to a core on which the first process is executing;
- descheduling the inactive moved processes once they have been moved to the core on which the first process is executing; and
- powering down other cores down to shut down as a number of moved processes increases
- wherein when the first process detects the release condition, powered down cores are powered up and are available for use by the processes; and
- the first process wakes the inactive moved processes before moving the inactive moved processes back to the cores on which the inactive moved processes were executing, and then the processes continue with normal execution,
- wherein a last thread to reach the barrier is not moved to the core on which the first thread is executing and continues with thread execution.

13. A computer system with multiple cores arranged to implement a synchronization method, comprising:
- a group of cores, having processors, arranged to allow parallel execution of a plurality of processes using barrier synchronization, where each process in the group waits for all other processes at a barrier before progressing, the cores are arranged to allow execution of the processes until a first process reaches the barrier;
- a core on which the first process is executing is arranged to then allow the first process to enter a polling state, in which the first process checks for a release condition indicating that a required number of the group of processes has reach the barrier; and
- further cores are arranged to allow execution of subsequent processes which reach the barrier subsequently and become inactive; to allow some or all of the subsequent inactive processes to be moved to the core on which the first process is executing and then to be powered down to shut down as a number of moved processes increases;
- wherein the core on which the first process is executing is arranged to allow the first process to deschedule the inactive moved processes once they have been moved to the core on which the first process is executing, to detect the release condition, to wake the inactive moved processes before moving the inactive moved processes back to the further cores on which inactive moved processes were executing, and then the processes continue with normal execution,
- and the further cores are operable to be powered up for use by the processes,
- wherein a last thread to reach the barrier is not moved to the core on which the first thread is executing and continues with thread execution.

14. A non-transitory, machine-readable storage medium storing a computer program which when executed on a computer system with multiple cores carries out a method, comprising:
- executing a group of processes in parallel on a plurality of cores, the group of processes being synchronized using barrier synchronization in which each process in the group waits for all other processes at a barrier before progressing;
- executing the group of processes until a first process reaches the barrier;
- repeatedly checking, when the first process enters a polling state, for a release condition indicating that a required number of the group of processes has reached the barrier and become inactive;
- moving some or all of subsequent inactive processes to reach the barrier to a core on which the first process is executing;
- descheduling the inactive moved processes once they have been moved to the core on which the first process is executing; and
- powering down other cores to shut down as a number of moved processes increases,
- wherein when the first process detects the release condition, powered down cores are powered up and are available for use by the processes; and
- the first process wakes the inactive moved processes before moving the inactive moved processes back to the cores on which the inactive moved processes were executing, and then the processes continue with normal execution,
- wherein a last thread to reach the barrier is not moved to the core on which the first thread is executing and continues with thread execution.

* * * * *